United States Patent [19]

Jamal

[11] Patent Number: 5,754,537
[45] Date of Patent: May 19, 1998

[54] METHOD AND SYSTEM FOR TRANSMITTING BACKGROUND NOISE DATA

[75] Inventor: Karim Jamal, Stockholm, Sweden

[73] Assignee: Telefonaktiebolaget L M Ericsson (publ), Stockholm, Sweden

[21] Appl. No.: 613,216

[22] Filed: Mar. 8, 1996

[51] Int. Cl.$^6$ .............................. H04B 7/212; H04B 7/26
[52] U.S. Cl. .................... 370/330; 370/337; 370/348; 370/349; 370/444; 370/447; 395/2.23; 395/2.35; 455/501; 455/67.3
[58] Field of Search ................... 370/330, 336, 370/337, 343, 345, 347, 348, 349, 389, 400, 401, 410, 442, 443, 444, 445, 447, 461, 462, 522, 528, 332; 395/2.09, 2.1, 2.23, 2.35, 2.36; 455/501, 507, 509, 512, 517, 524, 67.1, 67.3

[56] References Cited

U.S. PATENT DOCUMENTS

| | | | |
|---|---|---|---|
| 4,319,353 | 3/1982 | Alvarez, III et al. | 370/321 |
| 4,581,734 | 4/1986 | Olson et al. | 370/447 |
| 4,644,537 | 2/1987 | Gitlin et al. | 370/207 |
| 4,907,224 | 3/1990 | Scoles et al. | 370/443 |
| 5,105,443 | 4/1992 | Betts et al. | 370/265 |
| 5,121,385 | 6/1992 | Tominaga et al. | 370/435 |
| 5,121,391 | 6/1992 | Paneth et al. | 370/341 |
| 5,152,007 | 9/1992 | Uribe | 455/116 |
| 5,327,429 | 7/1994 | Dartois et al. | 370/350 |
| 5,341,456 | 8/1994 | DeJaco | 395/2.23 |
| 5,414,796 | 5/1995 | Jacobs et al. | 395/2.3 |
| 5,485,522 | 1/1996 | Solve et al. | 381/56 |
| 5,499,243 | 3/1996 | Hall | 370/341 |
| 5,577,024 | 11/1996 | Malkamaki et al. | 370/337 |

FOREIGN PATENT DOCUMENTS

| | | |
|---|---|---|
| 0 489 993 A1 | 6/1992 | European Pat. Off. . |
| 0 681 406 A1 | 11/1995 | European Pat. Off. . |
| 2 270 815 | 3/1994 | United Kingdom . |
| 2 278 976 | 12/1994 | United Kingdom . |
| 2 278 977 | 12/1994 | United Kingdom . |
| 2 278 978 | 12/1994 | United Kingdom . |

OTHER PUBLICATIONS

Alistair Urie, Malcolm Streeton, and Christophe Mourot, "An Advanced TDMA Mobile Access System for UTMS", *IEEE Personal Communications*, pp. 38–46, Feb. 1995.

*Primary Examiner*—Alpus H. Hsu
*Attorney, Agent, or Firm*—Jenkens & Gilchrist, P.C.

[57] ABSTRACT

A method and system for transmitting background noise information on a packet reservation multiple access radio channel. In the method and system, relative priorities are assigned to background noise data transmissions and speech data, or other data traffic, transmissions. The priorities are assigned so that the effect of background noise data transmissions on the delays and quality of speech data, or other data traffic, transmissions within the system is reduced.

16 Claims, 9 Drawing Sheets

METHOD AND SYSTEM FOR TRANSMITTING BACKGROUND NOISE DATA

BACKGROUND OF THE INVENTION

1. Field of the Invention

This invention relates to multiple access telecommunications systems and, more particularly, to a method and system for transmitting background noise in a packet reservation multiple access (PRMA) digital radio telecommunications system.

2. History of the Prior Art

Discontinuous transmission (DTX) is a method of speech transmission in a digital telecommunications system in which a transmitter is turned off during periods of time when pauses occur in the transmitted speech. The use of DTX reduces transmitter power requirements and, can reduce the overall interference within the system. The use of DTX can also increase system channel capacity in non-orthogonal and packet reservation type systems by freeing channels for other uses when a transmitter is off in the DTX mode.

One basic problem with DTX occurs because the background acoustic noise that is contained in transmitted speech disappears during the periods of time when the transmitter is switched off. This results in a modulation of the background noise that can be very disturbing to a listener. In an automobile environment, with high background noise levels, this effect can be particularly bad. In the worst case, the transmitted speech may be unintelligible to the listener because of the background noise modulation.

Typically, the problem of background noise modulation is overcome by adding synthetic comfort noise during the decoding process at the receiver. The synthetic comfort noise is used to fill the gaps in speech caused by the use of DTX. Although some improvement in quality is achieved from adding comfort noise, the overall quality of the reception is not significantly increased since the comfort noise does not model the actual background noise environment of the transmitted speech.

A more preferred technique of overcoming background noise modulation problems is to transmit compressed digital data on the background noise from the transmitter during periods of silence in the transmitted speech. A representation of the background noise can then be reconstructed at the receiver from the compressed data.

By compressing the data on the background noise, the amount of data required to represent periods of silence during speech can be reduced and transmitted at a slower rate than the actual speech. The DTX mode can then be used to turn the transmitter on and off during the periods of silence to transmit the compressed data. The reduction in the data rate associated with transmitting compressed digital data to generate background noise at the receiver, as opposed to a complete halt in transmission or adding of synthetic comfort noise at the receiver, overcomes problems associated with background noise modulation more efficiently. This technique also provides the desired reduction in transmitted digital information during speech transmission, allowing use of DTX.

The compressed data on the background noise can be generated by a variable rate vocoder or a vocoder capable of a specialized comfort noise insertion function. The compressed data may be generated based on, e.g., the level and spectrum of the background noise.

As an example, in the GSM system a comfort noise evaluation algorithm is used in the speech encoder to create parameters that include information on the level and spectrum of the background noise. The evaluated comfort noise parameters are then encoded into a Silence Descriptor (SID) frame for transmission to the receiver. The SID frame also serves to initiate the comfort noise generation on the receive side, as the SID frame is always sent at the end of a speech burst, i.e., before the transmitter is switched off. In a GSM system, each traffic channel user is allocated one or more time slots of an RF carrier on a fixed basis, for as long as is necessary to carry out the desired communication. When DTX mode is being used and the transmitter is switched off and not transmitting, the channel assigned to the transmitter is still not available to other system users. The method of background noise insertion used in GSM therefore results in inefficient use of the TDMA radio channels.

Recently, developments moving toward universal compatibility in the digital cellular communications industry have lead to various proposals for universal mobile telephone systems (UMTS). Advanced TDMA (ATDMA) is one type of proposed UMTS. An example of an ATDMA system is described in the paper "An Advanced TDMA Mobile Access System for UMTS" by Alistor Urie et al., IEEE Personal Communications, February 1995. In this proposed ATDMA system, each user is not allocated one or more fixed TDMA time slots of a TDMA frame of an RF carrier as in GSM, but is instead allocated time slots of each TDMA frame on an activity basis so that DTX mode may be constantly used. The time slots are allocated by using a modified packet reservation multiple access (PRMA) scheme. In PRMA speech transmission, the user essentially requests access to a channel at the beginning of each speech burst. The channel may be one or more time slots per TDMA frame. A channel is then allocated and used until the speech burst is complete. Once the speech burst is complete, the channel is released. Background noise data may also be transmitted during periods of silence in the speech. As such, a PRMA allows a system to support more voice channel users than there are TDMA voice channels on a single packet reservation multiple access radio channel (RF carrier). Various PRMA protocols have been proposed. One example of a PRMA type protocol is described in the paper "A Reservation Multiple Access Scheme for an Adaptive TDMA Air Interface" by J. Devile, 4th WINLAB Workshop, Nov. 19, 1993. This same type of PRMA protocol is also disclosed in Great Britain patent application No. 9219824.1 by Devile, published as document number 2270815 on Mar. 23, 1994, and, Great Britain patent applications Nos. 9312003.8, 9312005.3 and 9312006.1, each by Devile and published as document numbers 2278976, 2278977 and 2278978, respectively, on Dec. 14, 1994.

In a UMTS system using PRMA, it would be desirable to have as efficient a background noise insertion procedure as possible. One possible method of background noise insertion in the UMTS system would be to allocate a normal channel for periods between speech bursts for carrying background noise information as is done in GSM. This channel then could be allocated one slot every Nth TDMA frame for background noise data. The value of N could be chosen as required to provide a certain background noise quality.

In the presently proposed PRMA type systems, the user would access the PRMA radio channel for transmitting background noise data with the same priority, relative to other transmissions, as is used to access the PRMA radio channel for a speech burst. Background noise data can typically tolerate delays (≈100 ms.) On the order of three times that which speech data can tolerate (10–30 ms.) Also, background noise data can tolerate a lower quality of service on a radio channel. Assigning the same priority to background noise data and speech data does not recognize the fact that background noise data has different transmission requirements than speech information. In this case, it would be possible for background noise information for one user to displace speech data transmissions, or data transmissions, from another user. The displacement of speech information by background noise data could cause unacceptable transmission delays in the speech data or data transmissions of other users. Furthermore, if the channel were allocated one slot every Nth frame, it would be difficult to find an efficient use for the other N−1 time slots of the channel because other users may be requesting slots in more than N consecutive frames.

It would provide an advantage then, in a PRMA type telecommunications system, to have a method and system for transmitting background noise data that reduces the effect of background noise data transmission on other data transmissions.

SUMMARY OF THE INVENTION

The present invention provides a method and system for transmitting background noise data in a packet reservation multiple access (PRMA) type telecommunications system. The background noise data transmission of the invention is accomplished in a manner that allows channel resources of the system to be allocated between background noise data transmissions and system speech or other data transmissions in an efficient manner. The invention takes advantage of the fact that speech or other data transmissions have different delay and quality of service requirements than background noise data transmissions. By assigning relative priorities to the background noise data transmissions and the speech or other data transmissions of the system, channel resources can be assigned so that the effect of background noise data transmissions on delays and quality of other transmissions within the system is reduced. Existing techniques of background noise data transmissions do not allow TDMA channel resources to be assigned to background noise data and other data transmissions according to efficiency considerations.

In an embodiment of the invention, the method and system is implemented in a PRMA type system in which users contend for a TDMA channel comprising one or more time slots of a TDMA frame. Mobile station users contend for uplink TDMA channel access by transmitting an access request burst on a system uplink packet reservation multiple access radio channel (RF carrier) to a base station. A PRMA mode data logical channel within the mobile station is divided into a speech data logical channel and a background noise logical channel. The speech logical channel carries speech data. The background noise logical channel carries background noise insertion data. The speech data logical channel and background noise logical channel have different delay constraints. When operating in PRMA mode, a mobile station transmits access request bursts in an access request time slot to request a TDMA channel. The TDMA channel comprises one or more time slots of a TDMA frame used for a speech logical channel or a background noise logical channel. The system receives the access request, places the access request in an access request queue, and determines whether the requested TDMA channel is available. If the requested TDMA channel is available, the system returns an access granted burst to the mobile station, assigning the TDMA channel to the logical channel requesting access. When a speech logical channel or background noise logical channel is assigned a TDMA channel, the logical channel data is transmitted in the time slots of the assigned uplink TDMA channel. If the requested TDMA channel is not available, the system returns an access denied message acknowledging the access request bursts and, the access request remains in the access request queue. When the TDMA channel then becomes available during subsequent TDMA frames, the system will transmit an access granted burst to the mobile station.

If the initial access request burst is not received by the system, no access message is returned to the mobile station. If no access message is returned, the mobile station waits a predetermined period of time and retransmits the access request burst.

Transmitted access bursts requesting a TDMA channel include a data field indicating which type of logical channel, speech or background noise, is attempting to access a TDMA channel. When the latest received access request bursts are placed in the access request queue, the type of logical channel for which each request is received is considered in the allocation of the TDMA time slots. Access requests to a TDMA channel for a background noise logical channel is assigned a lower priority than an access request for a speech logical channel.

The predetermined period of time before an access request to a TDMA channel for a background noise logical channel is retransmitted, if no access reply burst is received, can be different than the predetermined period of time before an access request to a TDMA channel for a speech logical channel is retransmitted. Setting the retransmission rate in this way reduces the overall load on the system caused by background noise data transmissions. Relative priorities may then be assigned to the downlink speech data logical channel queue and background noise logical channel queue so that the effects of background noise data transmissions on downlink TDMA channel delay and quality are reduced.

Network users transmitting to mobile stations in the network gain access to a TDMA downlink channel by sending speech data or background noise data to a base station for transmission. The speech data and background noise data are prioritized and placed into a transmission data queue. Relative priorities for transmission may then be assigned to the downlink speech data logical channel queue and background noise data logical channel queue. By assigning the speech data logical channel queue a higher priority, the effects of background noise data transmissions on downlink TDMA channel delay and quality are reduced.

In an alternative embodiment of the invention the speech data logical channels and background noise data logical channels have different quality of service constraints as well as different delay constraints. In this alternative embodiment, quality of service available on the various TDMA of a system is taken into account when access to a TDMA channel for speech data logical channels or for background noise logical channel is needed. In the alternative embodiment, the system's TDMA channels are grouped according to quality of service provided by the RF carrier of each channel. Speech data logical channels are preferably assigned higher quality TDMA channels. Background noise logical channels are always assigned available lower quality TDMA channels. If only lower quality TDMA channels are available, a speech logical channel access request still retains priority over any background noise logical channel access request in gaining access to TDMA channels.

DETAILED DESCRIPTION OF THE INVENTION

Figure 1:
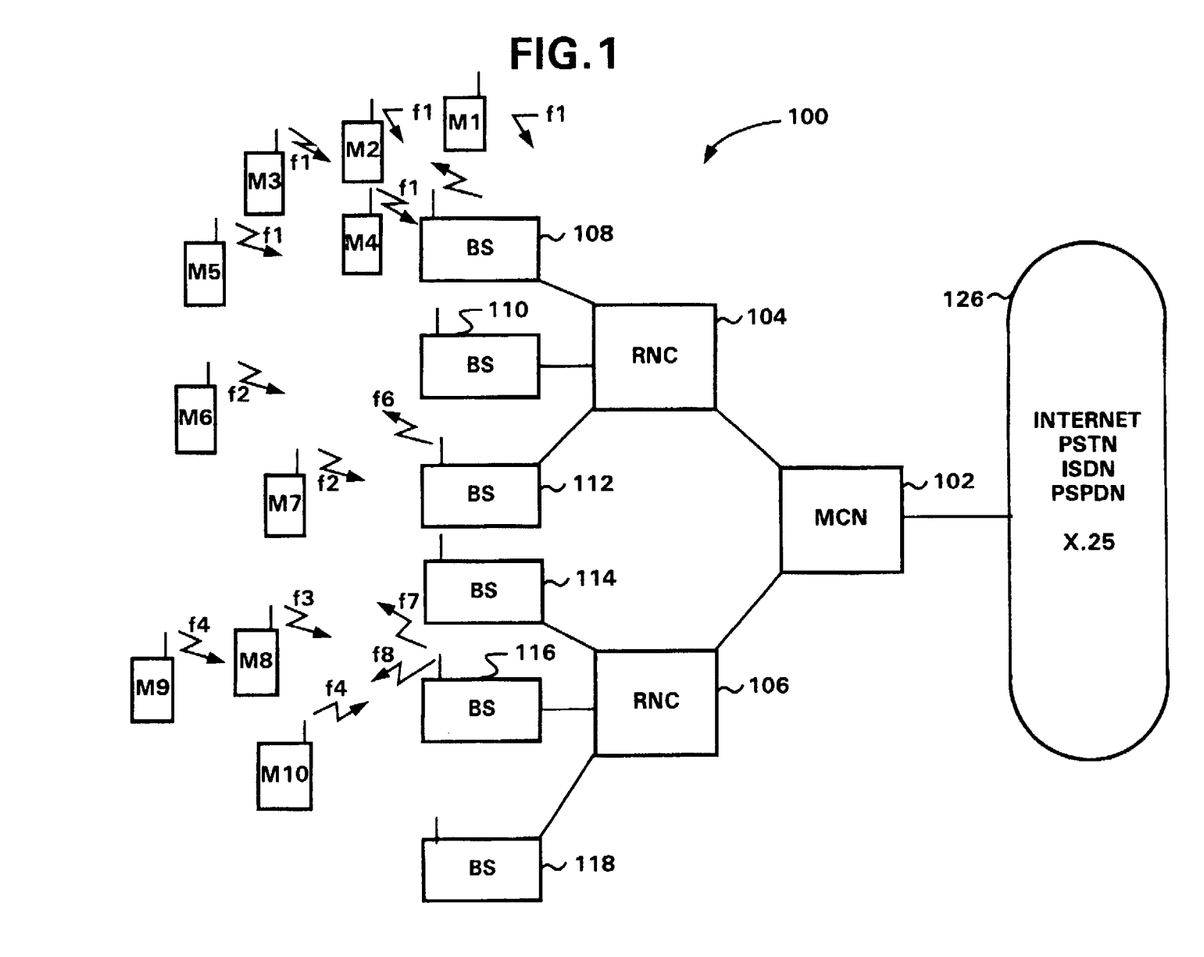
FIG. 1 is a block diagram of a cellular telecommunications system into which the present invention may be implemented.

Referring now to FIG. 1, therein is illustrated a block diagram of a cellular telecommunications system 100 into which the present invention may be implemented. Cellular system 100 comprises mobile control node (MCN) 102, radio network control nodes (RNCs) 104 and 106, base stations (BSs) 108, 110, 112, 114, 116 and 118, and mobile stations M1-M10. Each base station 108, 110, 112, 113, 116 and 118 controls system radio communications with mobile stations within the radio coverage area, termed a cell, of the particular base station.

Mobile stations M1-M10 communicate with a particular base station, of base stations 108, 110, 112, 114, 116 and 118, depending on which base station's coverage area the mobile is located. In FIG. 1 mobile stations M1-M5, M6-M7, and M8-M10 are communicating with base stations 108, 112 and 116, respectively. In FIG. 1 mobile stations M1-M5, M6-M7, and M8-M10 are transmitting to base stations 108, 112 and 116, on uplink radio frequencies f1, f2 and, f3 or f4, respectively. Base stations 108, 110 and 112 are transmitting on downlink frequencies f5, f6 and, f7 or f8, respectively. Base stations 108, 110 and 112 are connected to radio network controller 104, and, base stations 114, 116 and 118 are connected to radio network controller 106. Radio network controllers 104 and 106 are in turn connected to mobile control node 102. Mobile control node 102 is a switching center that supports the interconnection of the cellular system to fixed network 126. Mobile control node 102 may be connected to fixed network 126 by landlines or other equivalent connections. The fixed network 126 may comprise an internet network, a public switched telephone network (PSTN), an integrated services digital network (ISDN), a packet switched public data network (PSPDN), or a X.25 system. While the cellular telecommunications system of FIG. 1 is shown as a particular configuration, the block diagram is intended to be only an exemplary configuration of a system into which the present invention may be implemented. The invention has application to any telecommunications system in which users contend for radio channels on a packet basis.

In an embodiment of the invention, cellular system 100 is a universal mobile telephone system (UMTS) that operates according to protocols developed under the RACE (Research and Development into Advanced Communications Technologies for Europe) Program Advanced TDMA (ATDMA) Mobile Access project. In the UMTS system, TDMA radio service is provided to mobile stations M1-M10 via one or more TDMA radio channels. The UMTS is a mobile communication system using a packet reservation multiple access-type (PRMA) protocol.

The communications links between a mobile station and a base station are realized over an uplink TDMA channel comprising time slots in uplink TDMA frames and, a downlink TDMA channel comprising time slots in downlink TDMA frames. The number of time slots in each TDMA channel varies. The assigned time slots may be transmitted on the same frequency as the access request and access reply slots, or, may be transmitted on other frequencies. Multiple communication links between one base station and multiple mobile stations may be established through one TDMA frame by assigning different TDMA channels each comprising different time slots of the TDMA frame to different mobile stations. In the embodiment of the invention, the uplink and downlink frames are transmitted on separate frequencies in a frequency division multiplex scheme. As an alternative, the uplink and downlink frames may be transmitted on the same frequency with each of the frames being allotted different time periods, so that each is non-interfering with the other.

Figure 2:
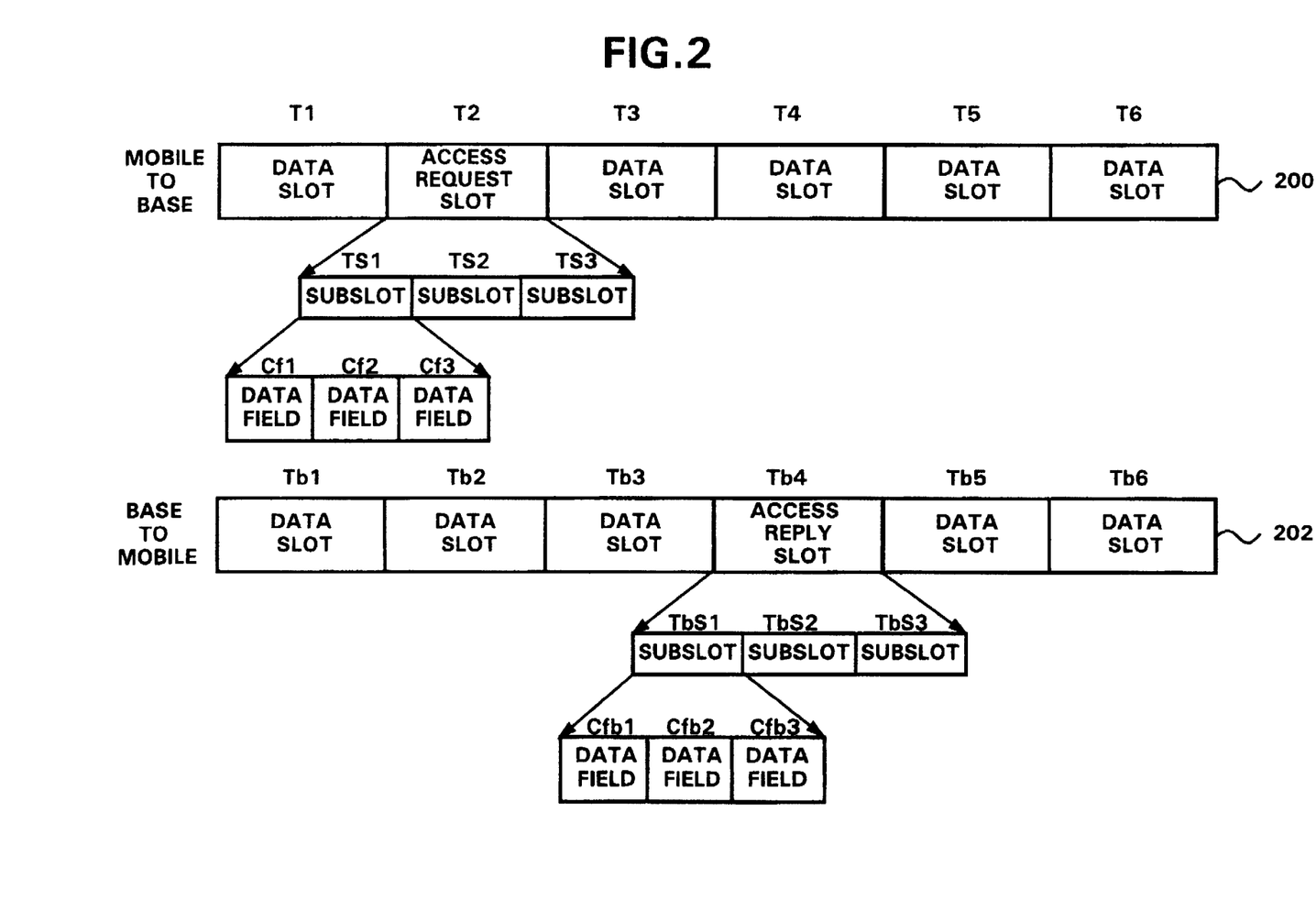
FIG. 2 illustrates a PRMA access request protocol according to an embodiment of the invention.

Referring now to FIG. 2, therein is illustrated a PRMA access request protocol according to an embodiment of the invention that may be implemented into the system of FIG. 1. The protocol of FIG. 2 is used when a mobile station requests access to an uplink TDMA channel. Uplink (mobile to base) TDMA frame 200 and downlink (base to mobile) TDMA frame 202 each include a plurality of TDMA time slots, T1-T6, Tb1-Tb6, respectively, within which data may be transmitted on an packet reservation multiple access radio channel (RF carrier). One time slot T2 of uplink TDMA frame 200 may be allocated for uplink access request burst transmissions and one time slot Tb4 of downlink TDMA frame 202 may be allocated for access request reply signal bursts transmitted to a mobile station in response to receiving an access request from a mobile station. The access request bursts for separate mobile stations are each transmitted in one of three subslots TS1-TS3, of time slot T2. Each subslot of subslots TS1-TS3 includes a logical channel field Cf1 identifying the type of logical channel (e.g. speech data or background noise data) for which a mobile station is requesting access, a field Cf2 identifying the transmitting mobile station and a field Cf3 identifying the number of TDMA time slots per frame required for the TDMA channel being requested.

For each time frame, upon receiving a TDMA channel access request from a mobile station, the system places the access request in an access request queue and prioritizes the requests in the queue. The system then determines if the required number of time slots are available for each access request in the queue. The system then transmits an access reply burst in access reply slot Tb4. The access reply burst may be either an access granted to an access request, received in the current or in a previous time frame, or acknowledgment message, to an access request received in the current TDMA frame.

If time slots are available for an access request in the queue, the system transmits an access granted message assigning available time slots to the mobile station associated with the request and creates a TDMA channel comprising the assigned time slots.

If the time slots are not available for requests received in the latest frame, the system transmits an acknowledgment message. The acknowledgment message indicates that the system has received the access request but that time slots are not currently available. Upon receiving an acknowledgment message, the mobile station then waits to receive an access grant message from the system in a later time frame. The access reply bursts for separate mobile stations are each transmitted in one of three subslots TbS1–TbS3, of time slot Tb4. Each subslot of subslots TbS1–TbS3 includes a field Cfb1 identifying the mobile station to which the access reply is sent and a field identifying if access is granted Cfb2.

If for some reason the access request message does not reach the system, no access reply burst is sent to the mobile. In this case the mobile station will wait a predetermined period of time before retransmitting the access request. In the embodiment of the invention, a mobile station operating in PRMA mode transmits both speech data and background noise data. The data is separated in the mobile station into a speech logical channel and a background noise logical channel. The mobile station will request speech logical channel access to a TDMA channel to transmit speech bursts during periods of speech. During periods of silence in between speech bursts, a mobile station requests background noise logical channel access to a TDMA channel to transmit background noise data. The speech logical channels and background noise logical channels are given different time delay requirements and therefore different priorities when requesting access to a TDMA channel.

A mobile station transmits access requests in time slot T2 of Frame 200 as pauses and bursts of speech occur in the speech being transmitted from the mobile station. At the beginning of a speech burst, a request to a TDMA channel for logical speech channel access will be transmitted in time slot T2. At the end of a speech burst, a request to a TDMA channel for a background noise logical channel access is transmitted in time slot T2. When receiving access requests, the system uses field Cf1 of the appropriate subslot of time slot T2 to identify whether the received request is for speech data logical channel or background noise logical channel access to a TDMA channel, and assigns the logical channel for which access is requested to a TDMA channel accordingly.

Figure 3A:
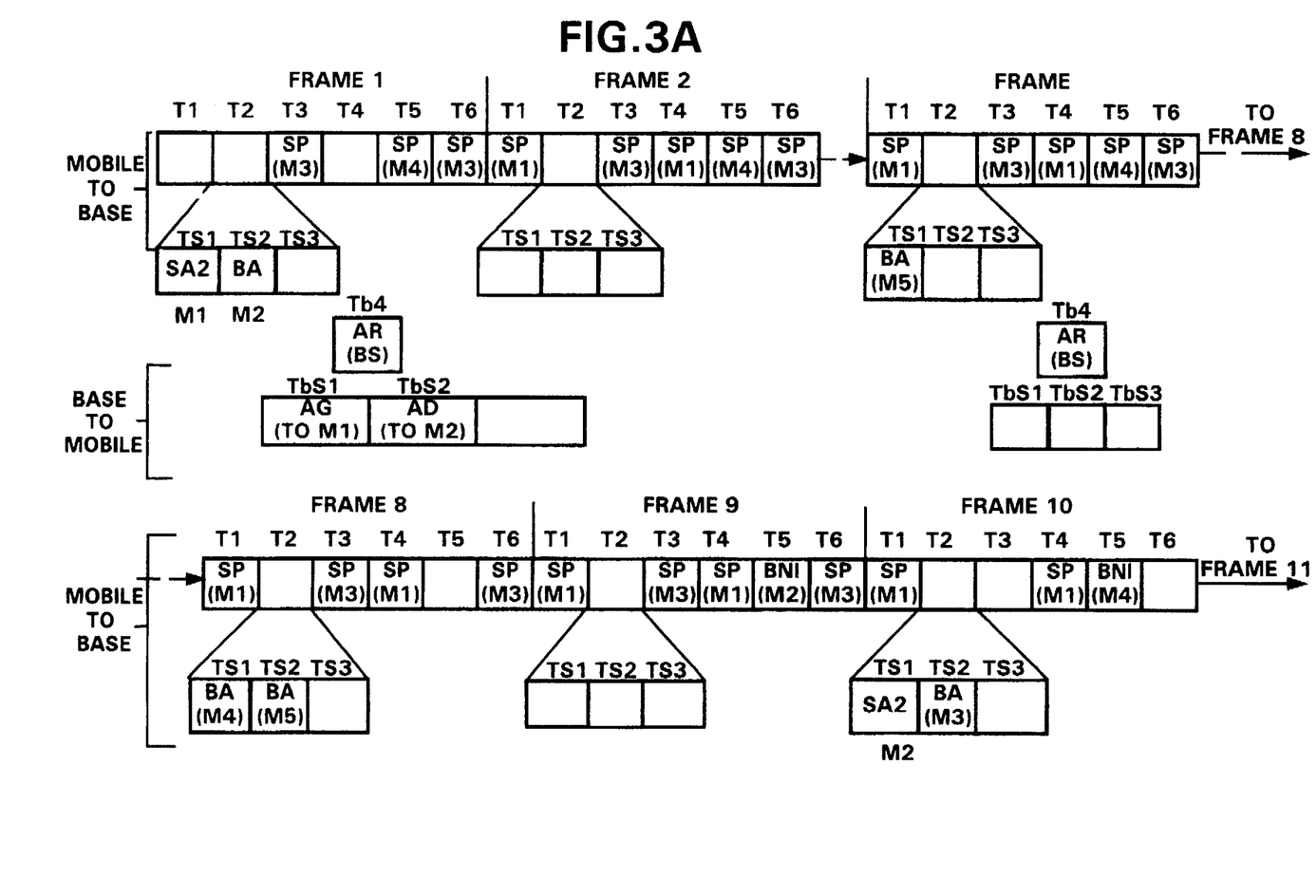
FIG. 3 illustrates PRMA mode speech transmission from a mobile station to a base station according to an embodiment of the invention.
Figure 3B:
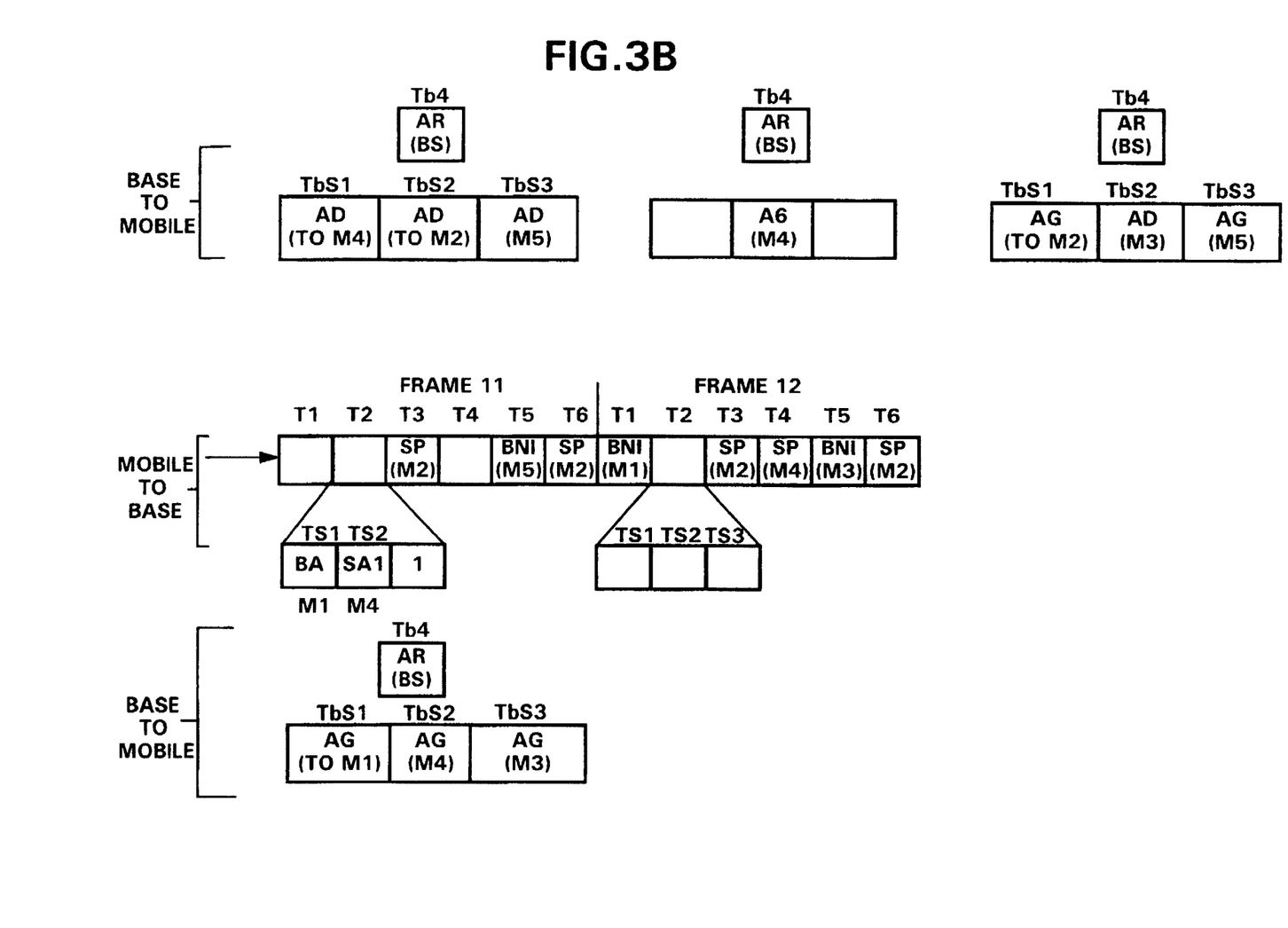

Referring now to FIG. 3, therein is a diagram that illustrates PRMA mode speech transmission from mobile stations to a base station according to an embodiment of the invention. FIG. 3 shows an example in which five mobile stations, M1–M5 of FIG. 1, are transmitting in PRMA TDMA frames carried on a single frequency f1 to base station 108. The PRMA access request protocol is as shown in FIG. 2. The mobile stations are shown to be transmitting speech and background noise in PRMA mode (mobile to base). A twelve frame sequence, Frame 1–Frame 12, as received at the base station, is shown. When there is no change in data transmitted from a mobile station as compared to a preceding frame, the frame is not shown. Each frame includes six TDMA time slots, T1–T6. The mobile stations transmit speech (SP) or background noise (BNI) data in the time slots of an assigned TDMA channel. In FIG. 3, the identity of the transmitting mobile station is shown in parenthesis at the bottom of the time slot. Time slot T2 of carrier f1 is allocated for the transmission of PRMA access requests from the mobile stations to the base station. Time slot T2 is divided into three subslots TS1, TS2, TS3, within which a mobile station may transmit an access request burst. An access request burst for speech logical channels and background noise logical channels are represented by the indicators SAX and BA, respectively, in time slots TS1, TS2 or TS3. The variable X of SAX indicates the number of time slots that the requested TDMA channel comprises per TDMA frame. In the embodiment, the TDMA channel assigned to a background noise logical channel comprises one time slot in a TDMA frame for the period of a single frame. If the pause in speeches continues, the mobile station requests access for the background noise logical channel every ten frames. The base station access reply messages, which are transmitted in subslots TbS1, TbS2 and TbS3 of time slot Tb4 of carrier f6, are also shown (base to mobile). For base station to mobile station transmissions, messages indicating that access is granted or access is denied are represented by the indicators AG and AD, respectively, in subslots TbS1, TbS2 or TbS3 of Tb4. The identity of the receiving mobile station is shown in parenthesis at the bottom of the subslot of TbS1–TbS3.

When access to a TDMA channel is granted for a speech logical channel from a mobile station, the time slot of the TDMA channel will be held by that speech logical channel until a speech burst ends. An access request for a background noise logical channel will then be transmitted from the mobile station.

In Frame 1, mobile station M1 is shown transmitting an access request to a TDMA channel that comprises two time slots of each frame for a logical speech channel (SA2) in subslot TS1 and, M2 is shown transmitting an access request for a background noise logical channel (BA) in subslot TS2 of time slot T2. In Frame 1, mobile station M3 has been reserved time slots T3 and T6 for a speech burst and, mobile station M4 has been reserved time slot T5 for a speech burst. Since only time slots T1 and T4 are available for the next frame, the access requests of M1 and M2 are conflicting.

Base station 108 receives the conflicting access requests from M1 and M2 in Frame 1, places the access requests in an access request queue and, assigns time slots of TDMA channels in a succeeding frame according to what type of logical channel access requests are in the queue. In FIG. 3, it is assumed that the access request queue is initially empty prior to Frame 1. Since only T1 and T4 are available for the next frame (Frame 2), the speech logical channel access request of M1 is given priority and M1 is assigned time slots T1 and T4. Messages indicating that access is granted and access is denied are then transmitted to mobile stations M1 and M2 in subslots TbS1 and TbS2, respectively, of time slot Tb4 by BS 108. Mobile station M1 will then transmit in time slots T1 and T4 according to the TDMA channel assignment continued in the access reply message. Mobile station M2 will then wait until it receives an access granted message in time slot Tb4 of a succeeding frame.

The next access attempt occurs in Frame 4, when M5 transmits a request for background noise logical channel access to a channel, in subslot TS1 of time slot T2. At Frame 4, base station 108 does not receive the access request for some reason, and no access reply message is transmitted to the mobile station. Because it received no reply, M5 will wait three frames before retransmitting the background noise logical channel access request. For retransmission of an unacknowledged speech logical channel, access request retransmission may occur at a higher rate.

No other access requests are transmitted until Frame 8, when M5 again retransmits the request for background noise logical channel access to a TDMA channel in subslots TS2 of time slot T2. Also, in Frame 8, the speech burst of M4 has ended and M4 is also requesting access for background noise logical channel access to a TDMA channel in subslot TS1 of time slot T2. Both of the background noise logical channel access requests are placed in the system access request queue upon receipt by the system. In the embodiment of the invention shown in FIG. 3, when conflicting access requests have equal priority, the access request having been in the access request queue the longest period of time has priority. Since the access request from M2 for access for background noise channel to a TDMA channel has been in the access requests queue the longest period of time, the system grants the background noise data access request of M2 priority over the background noise data access requests of M4 and M5, and M2 is allocated time slot T5 in Frame 9 for background noise data transmission. Messages indicating that access is granted to M2 and that access is denied to M4 and M5 are then transmitted, respectively, in subslot TS1 and TS2 of time slot Tb4 by BS 108. At Frame 9 no access requests are received by the system. The background noise logical channel access requests of M4 and M5 are in the queue. Since the single background noise burst in time slot T5 by M2 will be over for Frame 10, the system assigns time slot T5 in Frame 10 to the request of M4 in the access request queue and transmits an access granted message in TbS2 of time slot Tb4. Since the background noise logical channel access requests of M4 and M5 where received during the same TDMA frame priority of M4's request over M5's request is granted randomly.

The next access requests occur in Frame 10, when a request for logical speech channel access to a TDMA channel comprising two time slots is transmitted by M2 and a request for background noise logical channel access to a TDMA channel is transmitted by M3. These access requests are placed in the access request queue along with the access request of M5. M3 has just ended a speech burst in Frame 9. Since M4 will end its background noise data transmission at Frame 10, time slots are available for the requests of M2, which has priority, and M5, which has priority over the later request of M3, a message indicating that access is granted is transmitted to M2 and M5 in subslots 1 and 2, respectively, of time slot Tb4 by BS 108. M2 is assigned time slots T3 and T6 for the next speech burst and M5 is assigned T1 of frame 11 for background noise data transmission. An access denied message is also sent to M3 in subslot TbS2 of time slot Tb4.

At Frame 11, a logical speech channel access request is received from M5 requesting a TDMA channel comprising one time slot, and a request for background noise logical channel access is received from M1 and a speech logical channel access request is received from M4. These requests are placed in the access request queue along with the background noise logical channel access request of M3. Since M5's background noise data burst will end in Frame 11, time slots are available to satisfy all access requests in the access request queue, an access grant is transmitted to each of M1, M4 and M3 in subslots TS1, TS2 and TS3, respectively, of time slot Tb4 by BS 108. M1 is assigned T1 of frame 11 for background noise data transmission, M3 is assigned T5 for background noise data transmission and M4 is assigned T4 for speech burst transmissions. At Frame 12, no access requests are transmitted and the mobile stations M1, M2, M3 and M5 transmit the appropriate data in the assigned time slots.

Although the mobile stations M1-M5 were shown to be transmitting speech and background noise data, it will be understood that other types of data, such as fax, computer, etc., could be transmitted on the PRMA channel. In this case, these other data transmissions would also have priority over the background noise data transmissions when making access requests.

Figure 7A:
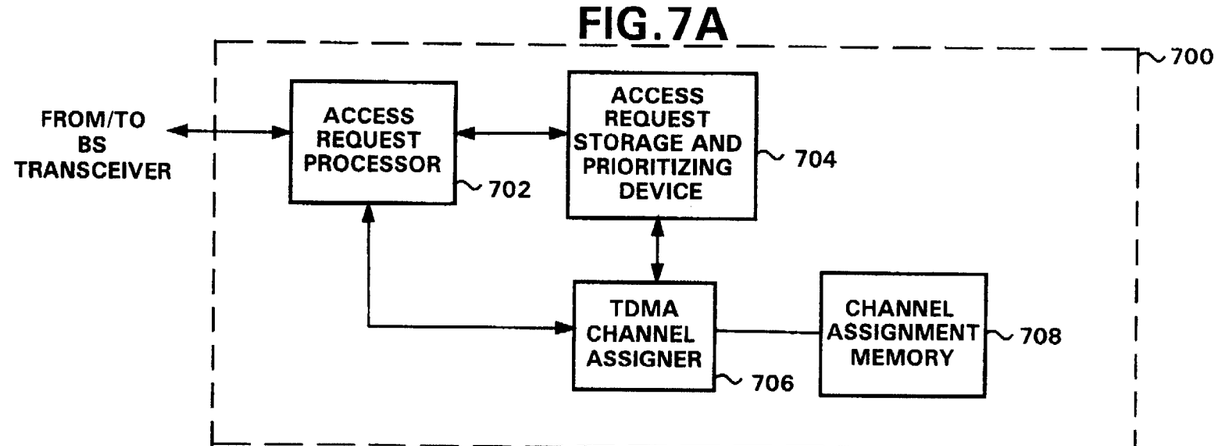
FIGS. 7A and 7B are functional block diagrams of portions of base station and mobile station circuitry, respectively, for assigning uplink TDMA channels according to an embodiment of the invention.
Figure 7B:
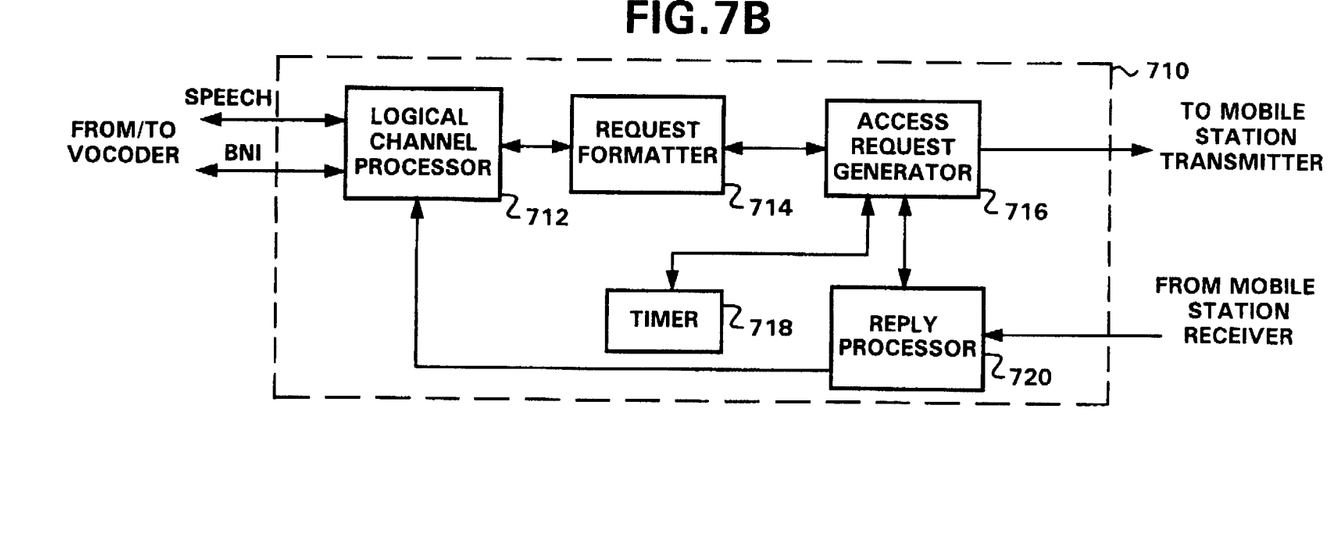

Referring now to FIGS. 7A and 7B, therein are illustrated functional block diagrams of portions of a base station and mobile station, respectively, into which the embodiment of the invention is implemented. Base station portion 700 comprises an access request processor 702, an access request storage and prioritizing device 704, a TDMA channel assigner 706 and a channel assignment memory 708. Mobile station portion 710 comprises logical channel processor 712, a request formatter 714, a request generator 716, a reply processor 720 and timer 718. One skilled in the art will recognize that the functional blocks illustrated in FIGS. 7A and 7B may be implemented in either hardware or software or, various combinations of both. Similarly, it will be recognized that the functions illustrated in FIGS. 7A and 7B may be differently divided and distributed throughout the components of a telecommunications system.

Figure 4:
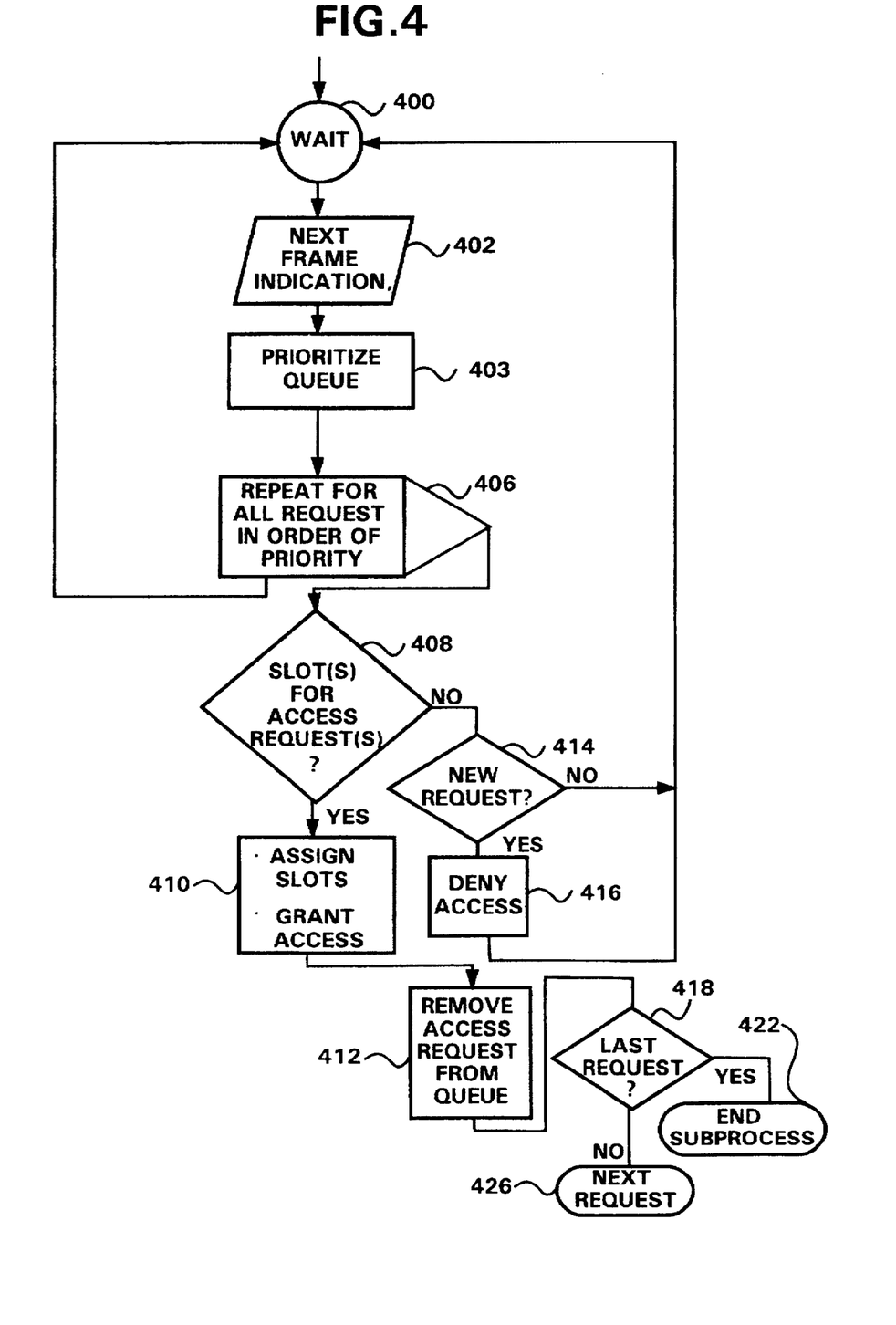
FIG. 4 is a flow diagram illustrating process steps for allocating uplink TDMA channels according to an embodiment of the invention.

Referring now to FIG. 4, therein is a flow diagram illustrating process steps for allocating uplink TDMA channels according to an embodiment of the invention. FIG. 4 illustrates the process steps of the embodiment of the invention that may be performed within the functional blocks of FIGS. 7A and 7B. The flow diagram may be described with reference to FIGS. 1, 2, 3 and, 7A and 7B.

When a base station is activated, the process is in the wait state of Step 400. At Step 400, for each TDMA Frame, a mobile station desiring access to a TDMA channel transmits an access request in a subslot of time slot T2. The access request burst is received at the base station and transferred to access request processor 702 and access request storage and prioritizing device 704. Access request prioritizing and storage device 704 stores the received access requests in a request queue.

Next, at Step 402, the access request processor 702 generates a signal indicating that access requests for the next time frame should be processed. This signal may be generated at the end of time slot T2 of each TDMA frame. Upon receiving the signal generated at Step 402, the process moves to Step 403. At Step 403 access request storage and prioritizing device 704 prioritizes the access requests in the access request queue. Access requests from speech logical channels are given higher priority than access requests from background noise logical channels in the requests queue. The access requests for each of the logical channels may also be prioritized among themselves in the queue. For example, the access request storage and prioritizing device may include a memory device for storing data indicating how long a denied access request has been in the queue and give priority to access requests from the same type of logical channel having been longest in the queue. If two conflicting access requests have the same priority, the access requests access may be ordered randomly relative to each other in the request queue.

Next, at Step 406, the subprocess of Step 406, which involves Steps 408 through 420, is repeated for all access requests in the access request queue.

At Step 408, TDMA channel assignor 706 determines whether a TDMA channel comprising the required number of time slots is available for the first (highest priority) access request in the access request queue. If the requested TDMA channel is available, the process moves to Step 410 where TDMA channel assignor 706 assigns time slot(s) to the logical channel for which the access request has been transmitted. TDMA channel assignor 706 then signals request processor 702 to generate a message indicating that access is granted to the mobile station requesting access. Next, at Step 412, TDMA channel assignor 706 signals access request storage and prioritizing device 704 to remove the access request from the request queue. From Step 412 the process moves to Step 424.

If, however, at Step 408, TDMA channel assignor 706 determines that the required TDMA channel is not available, the process moves to Step 414. At Step 414 the process determines if the access request is a new access request, i.e., if the access request was received during the current TDMA frame. If it is determined that the access request is a new access request, the process moves to Step 416 where TDMA channel assignor 706 signals request processor 702 to generate an access denied message to the requesting mobile station. The process then moves to Step 418.

If, however, at Step 414, it is determined that the access request has been in the queue during previous frames, the process moves directly to Step 418.

At Step 418 the access request processor 702 determines if the present access request is the last in the access request queue. If it is determined that the access request is not the last in the access request queue, the subprocess of Step 406 is repeated for the next highest priority access request. If, however, at Step 418, it is determined that it is the last request in the queue, the process of Step 406 ends at Step 422 and the process moves back to the wait state of Step 400.

The subprocess of Step 406 is repeated by TDMA channel assignor 706 for each logical channel access request in the request queue in order of descending priority in the queue. When the subprocess of Step 406 is completed for all access requests in the access request queue, the process returns to the wait state of Step 400.

Figure 5:
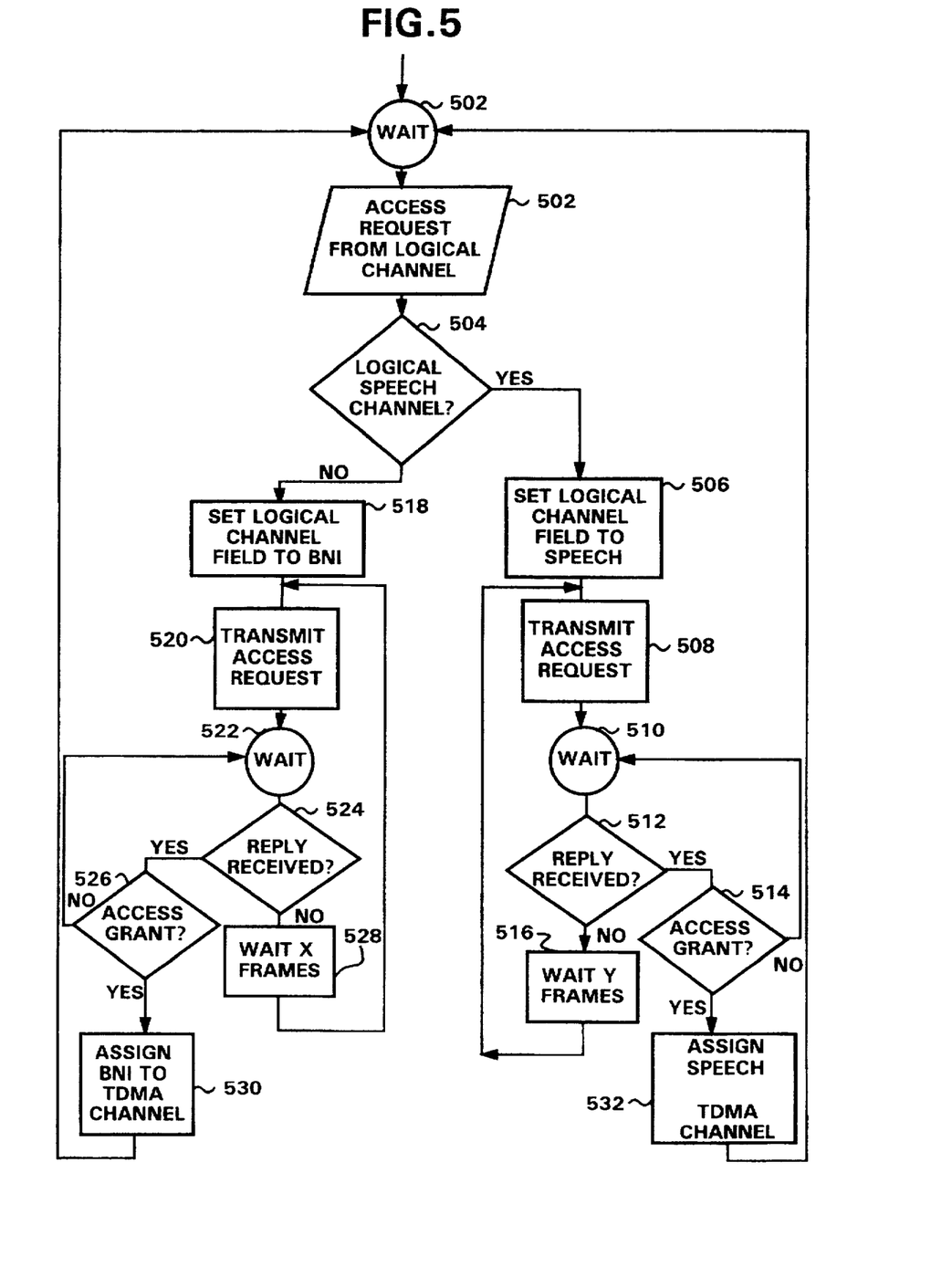
FIG. 5 is a flow diagram illustrating process steps for transmitting access requests to an uplink TDMA channel according to an embodiment of the invention.

Referring now to FIG. 5, therein is a flow diagram illustrating process steps followed when transmitting access requests from a mobile station according to an embodiment of the invention. When the mobile station is switched on and not transmitting, the process is active and in the wait state of Step 500. When it is necessary for a logical speech channel or background noise logical channel to have access to a TDMA channel, an access request indication is received from the mobile station vocoder by the logical channel processor 712 at Step 502. Next, at Step 504, the logical channel processor 712 determines whether the access request indication is from a logical speech channel or logical background noise channel.

If it is determined that the access request indication is for a logical speech channel, the process moves to step 506. At Step 506 request formatter 714 generates a signal to the logical access request generator 716 indicating that the next access request is for a logical speech channel. Next, at Step 508, access request generator 716 generates an access request transmission to a system base station. The process then waits at Step 510 for an access reply from the system. During Step 510, access reply bursts are received in the appropriate subslots and transferred to reply processor 720. Next, at Step 512, the reply processor 720 then makes a determination as to whether an access reply addressed to that particular mobile station was received. If it is determined that an access reply was received, the process moves to Step 514 where it is determined if the access reply was an access grant. If it is determined that the access reply was an access grant, the process moves to Step 532 where logical channel processor 712 sets up the logical channel to transmit on the assigned TDMA time slots. The process then moves back to the wait state of Step 500. If, however, at Step 514, it is determined that the access reply was not a grant, the process moves back to the wait state of Step 510 to wait for a reply in a succeeding time frame.

If, however, at Step 512, it is determined that no access reply was received addressed to that particular mobile station, the process moves to Step 516. At Step 516 the access request generator 716 waits for a time period, equal to a predetermined number Y of TDMA frames. After waiting the appropriate period of time, the process moves back to Step 508 and access request generator 716 retransmits the access request. The process then continues from Step 508.

The access request transmission process is identical when a request from a logical background noise channel is involved. In the case of access requests from logical background noise channels, the channel request processor 712 will determine at Step 504 that the access request indication is from a background noise logical channel. The process will then move to Step 518. Steps 518, 520, 522, 524, 526, 528 and 530 will then be performed in a manner identical to the way in which Steps 506, 508, 510, 512, 514, 516 and 532 are performed, excepting the fact that a background noise logical channel is involved instead of a speech logical channel. Also, when background noise logical channel requests are retransmitted, the process waits, at Step 528, for a predetermined number X of TDMA frames that may be longer than the predetermined number Y of TDMA frames for which the process waits in Step 516.

The access request retransmission parameter values X and Y that determine the number of frames the process waits before retransmitting the access requests for a logical background noise channel and logical speech channel, respectively, may be adjusted to take the different delay constraint requirements of the two logical channels. For example, since background noise transmission can typically tolerate delays on the order of three times that which speech can tolerate, X could be set three times longer than Y.

Downlink TDMA channels may also be allocated for transmission to mobile stations based on whether data to be transmitted is background noise data or speech data.

Network users transmitting to mobile station M1-M5, M6-M7 and M8-M10 contend for access to TDMA channels on downlink frequencies f5, f6 and f7 or f8, respectively, through base stations 108, 112 and 116, respectively, by sending speech data or background noise data to the base stations for transmission. The speech data and background noise data is divided and placed into a transmission queue for the appropriate downlink TDMA channel. For each downlink TDMA time frame, the speech data and background noise data in the queue may then be assigned to downlink TDMA channels with speech data having priority.

Figure 8:
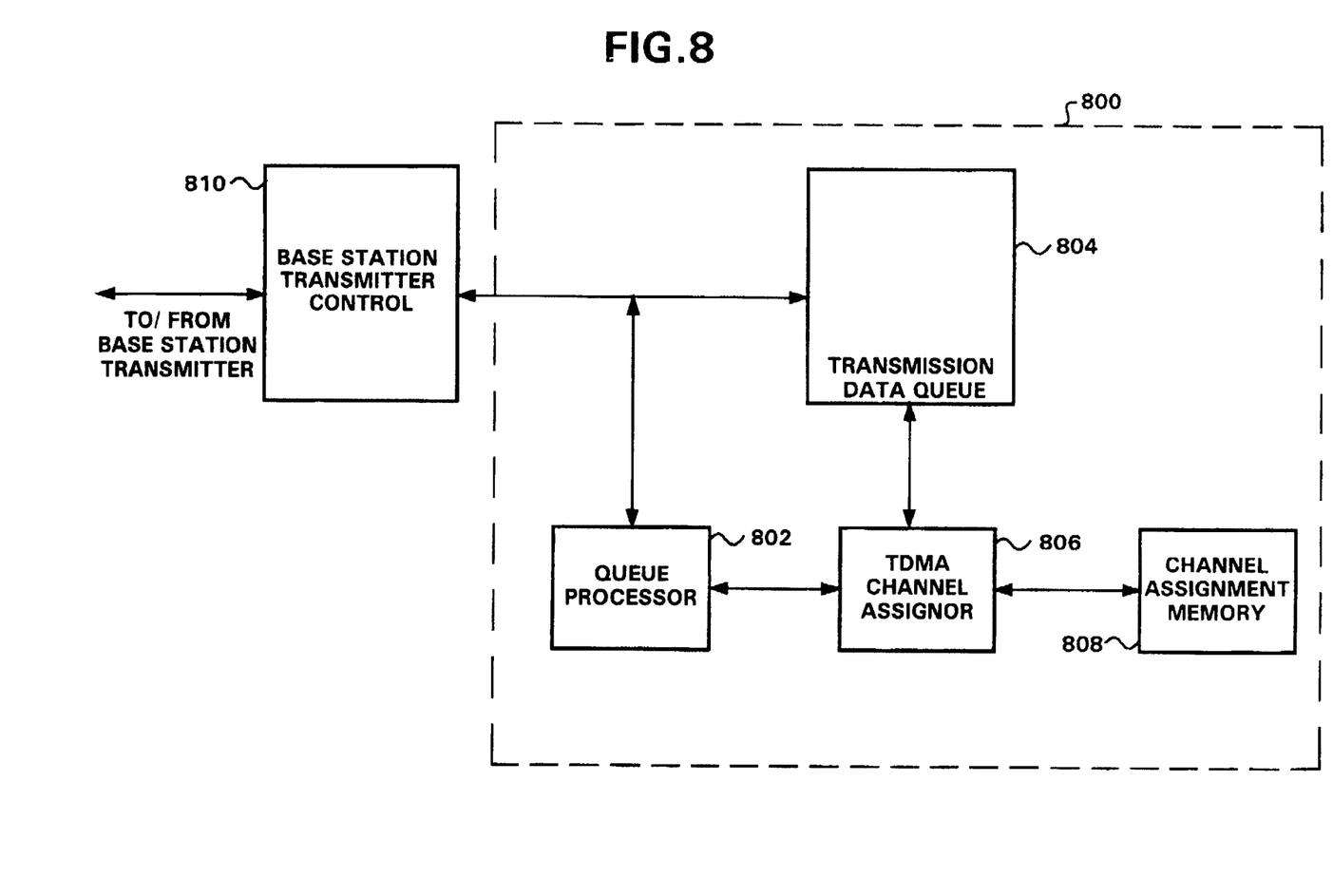
FIG. 8 is a functional block diagram of portions of base station circuitry for assigning downlink TDMA channels according to an embodiment of the invention.

FIG. 8 is a functional block diagram of portions of base station circuitry 800 for assigning downlink TDMA channels according to an embodiment of the invention. Transmission access circuitry 800 comprises queue processor 802, transmission data queue 804, TDMA channel assignor 806 and channel assignment memory 808. Transmission access circuitry 800 interfaces with base station transmitter control circuitry 810 to control the speech data transmission and background noise data transmission on the downlink radio channel or channels. For example, when two mobile stations communicate with one another in PRMA, speech and background noise data is transmitted to the system from one of the mobile stations and transferred through the system to the base station transmitter control circuitry 810 of the base station communicating with the other mobile station. The base station transmitter control circuitry 810 transfers the speech and background noise data to transmission data queue 804. Queue processor may be used to prioritize the speech and background noise data in data queue 804. The prioritizing may be done as was done by the access request and prioritizing device 704 of FIG. 7A in Step 403 of FIG. 4. Periodically, for example, once during every downlink TDMA frame, queue processor 802 and TDMA channel assignor 806, channel assignment memory 808 may then prepare the data in the transmission data queue 804 for transmission in the next downlink TDMA frame giving priority to the data having the highest priority in the queue.

In an alternative embodiment of the invention, the quality of service available on the various channels of the system is also taken into account when access requests for speech or background noise logical channel access to a TDMA channel are received from a mobile station.

The alternative embodiment of the invention may be implemented into a system using a PRMA access protocol of the type shown in FIG. 2. In the embodiment, TDMA channels that provide a lower quality of service are assigned to background noise logical channels, and TDMA channels that provide a higher quality of service are preferably assigned to logical speech channels. The relative quality of service levels of the TDMA channel of a system can be determined by monitoring the time slots of a TDMA frame channels over time. For example, bit error rate (BER) may be measured in the TDMA time slots transmitted on the various frequencies allocated to the system. The frequencies could then be ranked according to BER measurements. For example, time slots transmitted on the carriers having a BER in the top fifty percent of the measures BERs could be categorized as high quality time slots, while all other time slots could be categorized as low quality time slots. Time slots could then be assigned to requests for background noise logical channels on one or more of the frequencies having the highest BERs. If TDMA time slots on all frequencies become congested and it was necessary to allocate some of the frequencies having higher BERs to logical speech channels, the process of FIG. 4 could then be initiated where logical speech channels and background noise logical channels contend for TDMA slots on the same lower quality RF carrier.

Figure 6:
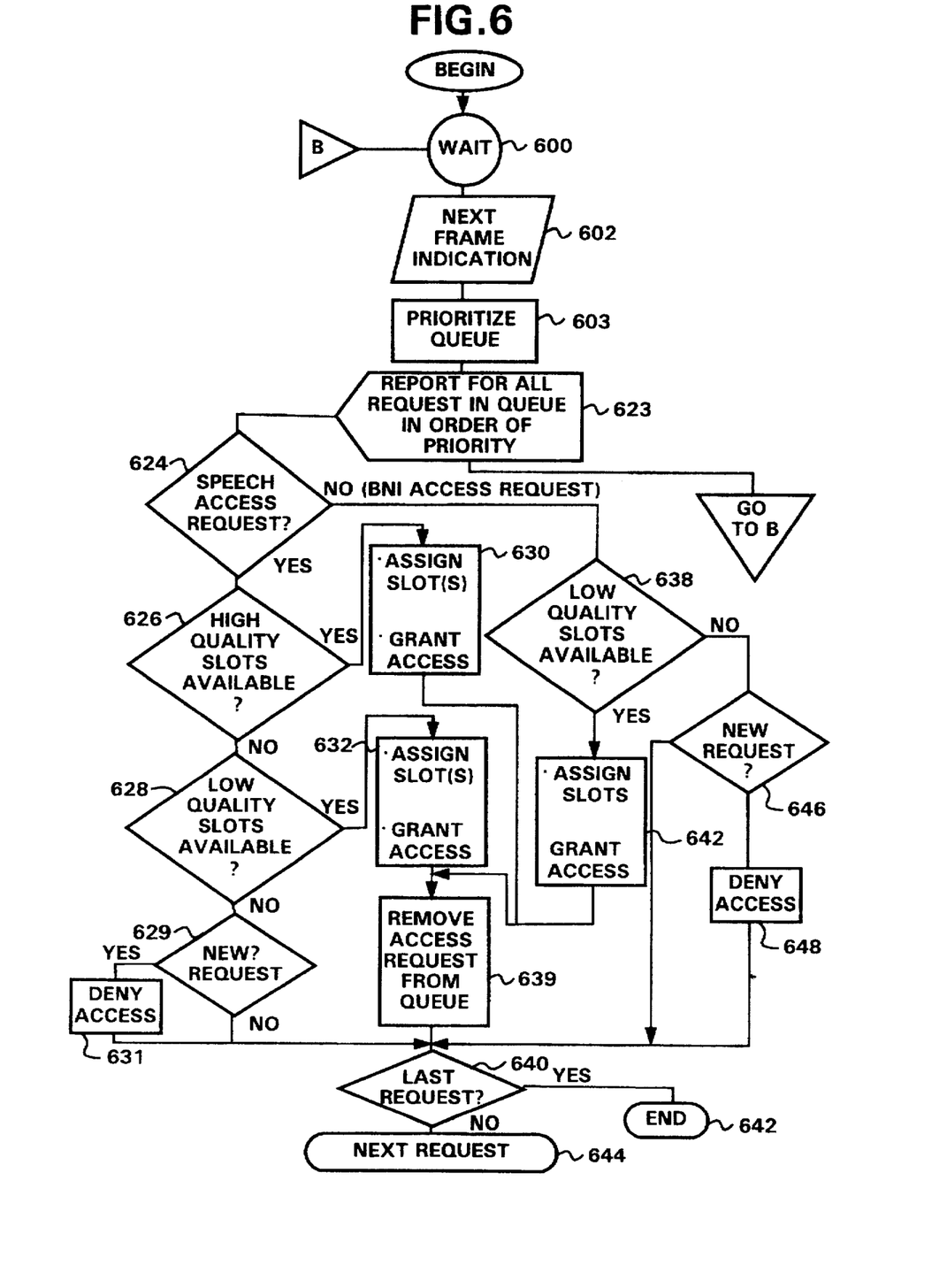
FIG. 6 is a flow diagram illustrating process steps for allocating uplink TDMA channels according to another embodiment of the invention.

Referring now to FIG. 6, therein is a flow diagram illustrating the process followed when allocating TDMA channels within a system according to an alternative embodiment of the invention. The process steps of FIG. 6 may be carried out within the functional blocks of FIGS. 7A and 7B, with the functions of the blocks performing the process steps of the alternative embodiment.

When the base station is activated and idle, the process is in the wait state of Step 600. When a mobile station or stations desires access to a TDMA channel, each mobile station desiring access transmits an access request in a subslot of time slot T2. During Step 600, the access request burst(s) are received at the base station and transferred through access request processor 702 to access request storage and prioritizing device 704. Next, at Step 602, access request processor 702 generates a signal indicating that the access requests for the next TDMA frame should be processed. At Step 603 access request storage and prioritizing device 704 prioritizes the access request queue. The prioritizing may be done as was done by the description for Step 403 of the process of FIG. 4.

Next, at Step 623, the subprocess of Step 623 which involves assigning each of the access requests in the access request queue to TDMA channels in order of priority is performed. The subprocess begins at Step 624, where TDMA channel assignor 706 determines whether the highest priority access request in the request queue is a speech access request. If the highest priority access request is a background noise access request, the process moves to Step 638. At Step 638 TDMA channel assignor 706 determines whether low quality slots are available for the access request. If the requested low quality slots are available, the process moves to Step 642 where TDMA channel assignor 706 assigns the time slot(s) to the logical background noise channel for which access was requested. Next, at Step 639, TDMA channel assignor 706 signals access request and prioritizing device 704 to remove the assigned access request from the request queue. From Step 639 the process moves to Step 640. If, however, at Step 638, it is found that no low quality time slots are available for the access request, the process moves to Step 646 where it is determined if the present access request was received in the current TDMA frame. If the highest priority access request was received in the current frame, the process moves to Step 648 where TDMA channel assignor 706 signals access request processor 702 to generate an access denied message to the requesting mobile station. From Step 648 the process moves to Step 640. If, however, at Step 646, it is determined that the access request was not received in the current TDMA frame, the process moves directly to Step 640.

If, however, at Step 624, the highest priority access request is determined to be a speech access request, the process moves to Step 626. At Step 626 TDMA channel assignor 706 determines whether high quality time slots are available for the highest priority access request. If the requested high quality time slots are available, the process moves to Step 630 where TDMA channel assignor 706 assigns the time slot(s) to the logical speech channel for which the access request has transmitted, and signals access request processor 702 to generate an access granted signal to the mobile station requesting access. Next, at Step 639, TDMA channel assignor 706 signals access request storage and prioritizing device 704 to remove the assigned access request from the request queue. From step 639 the process moves to Step 640.

If, however, at Step 626, it is determined that high quality time slots are not available, the process moves to Step 628 where TDMA channel assignor 706 determines whether low quality time slots are available for the first access request in the request queue. If low quality time slots are available, the process moves to Step 632 where the TDMA channel assignor 706 assigns time a lot(s) to the logical speech channel for which the access request was transmitted and signals access request processor 702 to generate an access granted signal to the requesting mobile station. TDMA channel assignor 706 also signals access request storage and prioritizing device 704 to remove the access request from the request queue. Next, at Step 639, TDMA channel assignor 706 signals access request storage and prioritizing device 704 to remove the assigned access request from the request queue. From Step 639 the process moves to Step 640.

If, however, at Step 628, it is found that no low quality time slots are available for the access request, the process moves to Step 629 where it is determined if the present access request was received in the current TDMA frame. If the access request was received in the current TDMA frame, the process moves to Step 631 where TDMA channel assignor 706 signals access request processor 702 to generate an access denied message to the requesting mobile station. From Step 631 the process moves to Step 640. If, however, at Step 629, it is determined that the access request was not received in the current TDMA frame, no access denied message is generated and the process moves to Step 631.

At Step 640 it is determined if the present request is the last access request for which the subprocess of Step 623 is to be repeated. If the present request is the last request, the subprocess of Step 623 ends at Step 642 and the process returns to the wait state of Step 600. If the present access request is not the last in the access request queue, the subprocess of Step 623 is repeated for the next access request in the access request queue according to priority.

In the alternative embodiment, TDMA channels on the downlink may also be assigned for speech data and background noise data transmission to mobile stations by assigning speech data to higher quality TDMA time slots of downlink channels.

It is believed that the operation and construction of the present invention will be apparent from the foregoing description and, while the invention shown has been characterized as a particular embodiment, changes and modifications may be made therein without departing from the spirit and scope of the invention as defined in the following claims.

What is claimed is:

1. A method of allocating time slots for selective transmission of informational data and background noise data between a selected sending station and a selected receiving station in a TDMA communication system in which data is transmitted in bursts during a selected number of time slots defined upon at least one carrier between pairs of sending and receiving stations, groups of successive time slots forming frames, the background noise data and the information data together combinable at the receiving station, said method comprising the steps of:

detecting indications of access requests which request allocation of time slots for the communication of, alternatively, the informational data and background noise data, between selected pairs of the sending and receiving stations;

prioritizing the access requests for the allocation of the time slots responsive at least to which of the background noise data and the informational data the access request is requesting; and allocating available time slots to selected ones of the pairs of the sending and receiving stations.

2. The method of claim 1 wherein the access requests, of which indications thereof are detected during said step of detecting each, includes a data field identifying the access request to be for the communication of informational data.

3. The method of claim 1 wherein the access requests, of which indications thereof are detected during said step of detecting each, includes a data field identifying the access request to be for the communication of background noise data.

4. The method of claim 1 wherein said step of prioritizing comprises:

includes prioritizing access requests for the allocation of the time slots for the communication of informational data with a higher priority level than access requests for the allocation of the time slots for the communication of background noise data.

5. The method of claim 4 further comprising the step of storing a queue containing access requests, of which indications thereof are detected during said step of detecting, the access requests.

6. The method of claim 1 comprising the additional step of:

determining signal quality levels on each of the at least one carrier;

and, wherein said step of allocating is further responsive to the signal quality levels.

7. In a TDMA communication system in which data is transmitted in bursts during a selected number of time slots defined upon at least one carrier between pairs of sending and receiving stations, groups of successive time slots forming frames, an improvement of apparatus for allocating time slots for selective transmission of informational data and background noise data between a selected sending and a selected receiving station, the background noise data and the information data together combinable at the selected receiving station to form a receive signal, said apparatus comprising:

an access request receiver and prioritizer coupled to receive indications of access requests which request allocation of time slots for the communication of, alternatively, the information data and the background noise data, between selected pairs of the sending and receiving stations, said access request receiver and prioritizer for prioritizing the access requests for the allocation of the time slots responsive at least to which of the informational data and the background noise the access request is requesting; and a time slot assignor coupled to receive indications of prioritizations performed by said access receiver and prioritizer, said time slot assignor responsive thereto for assigning available time slots to selected ones of the pairs of the sending and receiving stations.

8. The apparatus of claim 7 wherein the access requests of which indications thereof are received at said access request receiver and prioritizer include data fields identifying the access request to be for the communication of informational data.

9. The apparatus of claim 7 wherein the access requests of which indications thereof are received at said access request receiver and prioritizer data fields identifying the access request to be for the communication of background noise data.

10. The apparatus of claim 7 wherein said access request receiver and prioritizer prioritizes access requests for the allocation of the time slots for the communication of informational data with a higher priority level than access requests for the allocation of the time slots for the communication of background noise data.

11. The apparatus of claim 10 wherein said access request receiver and prioritizer further comprises a memory device for storing a queue containing access requests ranked by priority levels.

12. The apparatus of claim 11 wherein said time slot assignor further assigns available time slots to the selected pairs of sending and receiving stations to which access requests associated therewith exhibit highest priority levels.

13. The apparatus of claim 12 wherein said time slot assignor further allocates available time slots to the selected pairs of sending and receiving stations which exhibit lower priority levels only subsequent to assignation of time slots responsive to every access request exhibiting a higher priority level.

14. The apparatus of claim 7 wherein the at least one carrier comprises a plurality of carriers and wherein said apparatus further comprises:

a signal quality determiner for determining signal quality levels on each of the plurality of carriers and for associating signal quality levels with the time slots defined thereon;

and, wherein said time slot assignor is further coupled to receive indications of the signal quality levels determined by said signal quality determiner and assignations made thereat are further responsive thereto.

15. In a TDMA communication system in which data is transmitted in bursts during a selected number of time slots defined upon at least one carrier between pairs of sending and receiving stations, groups of successive time slots forming frames, an improvement of apparatus for initiating an access request for requesting allocation of time slots for communication, selectively, of informational data and background noise data between a selected sending station and a selected receiving station, the background noise data and the information data together combinable at the selected receiving station to form a receive signal, said apparatus comprising:

a request detector and formatter coupled to receive indications of a request to initiate communications between the selected sending station and the selected receiving station, said request detector and formatter for setting a data field to a first value when the indications of the request are for the allocation of time slots for the communication of background noise data and to a second value when the indications of the request are for the allocation of time slots for the communication of information data; and an access request generator coupled to said request detector and formatter to receive the data field set thereat, said access request generator for generating an access request message including a value representative of the data field set by said request detector and formatter.

16. The apparatus of claim 15, further comprising a reply processor, coupled to said access request generator, said reply processor for determining whether an access reply message has been received from the base station, wherein said access reply message indicates that the base station has received said access request message, and generating a signal to said access request generator, to retransmit said access request message to the base station after a predetermined time period, if it is determined that said access reply burst has not been received, the duration of said predetermined time period determined by whether said data is background noise data or speech data.

* * * * *